United States Patent Office 2,911,590
Patented Nov. 3, 1959

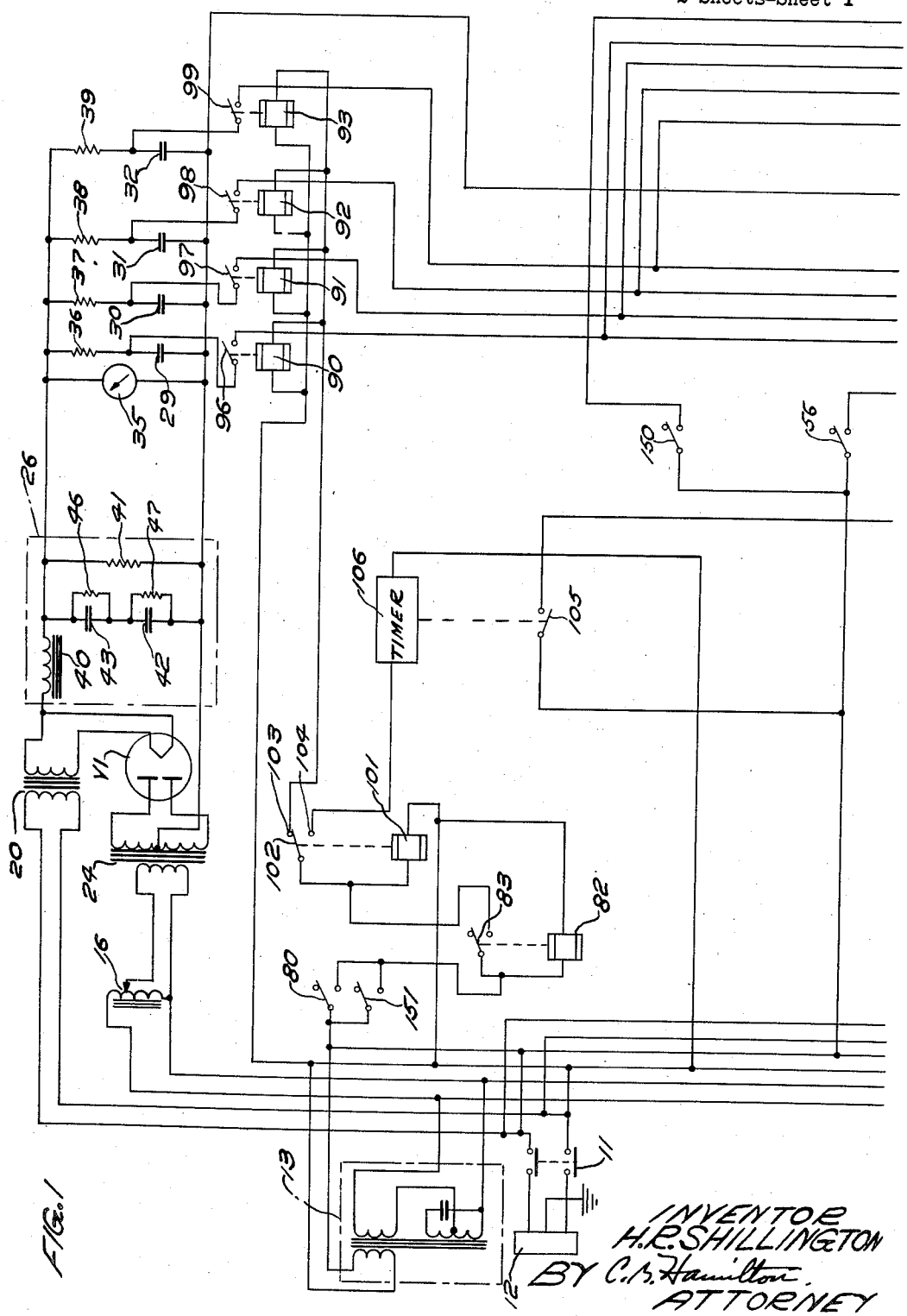

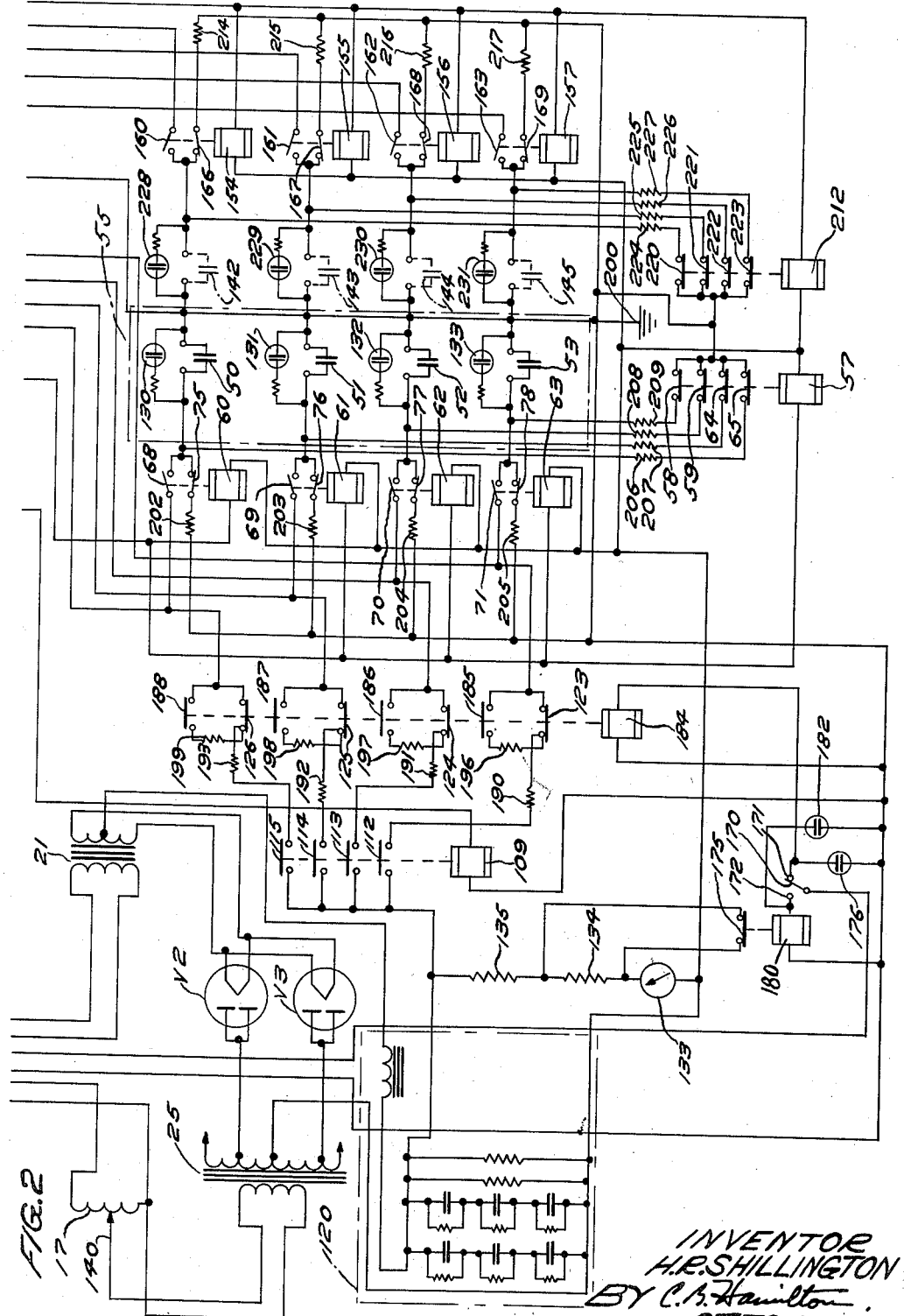

2,911,590

TESTING CIRCUITS

Harry R. Shillington, Glen Ellyn, Ill., assignor to Western Electric Company, Incorporated, New York, N.Y., a corporation of New York Application May 25, 1956, Serial No. 587,244

6 Claims. (Cl. 324—51)

This invention relates to testing circuits, and more particularly to circuits for testing capacitors.

An object of this invention is to provide a circuit for testing capacitors.

Another object of this invention is to provide a circuit for applying a high voltage to metallized electrode capacitors to remove internal shorts therein by vaporizing portions of the metallized electrodes adjacent to the shorts.

A further object of this invention is to provide a circuit for applying a high voltage to metallized electrode capacitors to remove shorts therein by vaporizing portions of the metallized electrodes adjacent to the shorts and for then testing the capacitors to determine whether the shorts have been removed.

One embodiment of the present invention may include a power supply for charging a bank of capacitors and for supplying direct current voltage to a plurality of capacitors having metallized electrodes and which are connected in test positions. Switching means are provided for discharging the bank of capacitors through the plurality of metallized electrode capacitors in test position to vaporize portions of the metallized electrodes adjacent to shorts whereby the shorts are removed. The switching means then disconnects the bank of capacitors from the metallized electrode capacitors and applies direct current voltage to them. Pilot lights are provided for indicating shorts in the tested capacitors.

Other objects and advantages of the invention will become apparent by reference to the following detailed description and the accompanying drawings illustrating a preferred embodiment of the invention, wherein Fig. 1 is a schematic illustration of a portion of a circuit embodying the principles of the present invention, and Fig. 2 shows the remainder of the schematic diagram of the capacitor testing circuit with its components in normal unactuated position.

Referring now in detail to the drawings, a switch 11 is closed to connect a power supply 12 to a transformer 13 which supplies a constant voltage to voltage controllers 16 and 17. The closing of switch 11 also applies power to filament transformers 20 and 21 of rectifying tubes V1, V2 and V3 connected to transformers 24 and 25, which are connected to the voltage controllers 16 and 17. The output of the rectifier tube V1 is passed through a filter network 26 to a bank of capacitors 29, 30, 31 and 32 connected in parallel. The filter network 26 consists of a choke coil 40, resistors 41, 46 and 47 and capacitors 42 and 43, and is provided for smoothing the output voltage of the rectifier tube V1. A voltmeter 35 (Fig. 1) connected in parallel with the capacitors 29—32 is provided for measuring the output voltage of the tube V1.

A plurality of capacitors 50, 51, 52 and 53 having metallized electrodes (not shown) are connected as illustrated in Fig. 2 and are covered by a hood 55 (illustrated by a dotted outline in Fig. 2 but not otherwise shown) manually movable into this position. When the hood 55 is moved to cover the capacitors 50—53 it closes a switch 56. The switch 56 is shown in Fig. 1 but the physical connection between it and the hood 55 is not shown. The closing of switch 56 applies power to relays 60, 61, 62 and 63 (Fig. 2) which close contactors 68, 69, 70 and 71, respectively, and which open contactors 75, 76, 77 and 78, respectively. The closing of the switch 56 also energizes a relay 57 (Fig. 2) to open normally closed contactors 58, 59, 64 and 65.

The moving of the hood 55 into position to cover the capacitors 50—53 also closes a switch 80 to apply power to a time delay relay 82. The switch 80 is shown in Fig. 1 but the physical connection between it and the hood 55 is not shown. After a time interval of approximately one second, the time delay relay 82 closes a contactor 83 whereby power is applied through a contactor 102 and a contact 103 to a plurality of relays 90, 91, 92 and 93 which close contactors 96, 97, 98 and 99 associated with the capacitors 29, 30, 31 and 32, respectively. Upon the closing of the contactors 96—99, the charged capacitors 29—32 are discharged through the contactors 68—71 and the capacitors 50—53, respectively. If there are any shorts in any of the metallized electrode capacitors 50—53, the discharge current of the bank of capacitors 29—32 will vaporize the metallized electrodes of the capacitors 50—53 from areas surrounding the shorts whereby they are removed. The time delay relay 82 is provided to insure that the contactors 68—71 are fully closed and the contactors 75—78 are fully opened before the contactors 96—99 are closed to connect the bank of capacitors 29—32 to the capacitors 50—53. Resistances 36, 37, 38 and 39 are provided for limiting current flow from the tube V1 as the capacitors 29—32 are discharged.

Approximately one second after the operation of relay 82 a time delay relay 101 operates to move the contactor 102 to engage a contact 104. This disconnects the power supply 12 from the relays 90—93 whereby the contactors 96—99 are opened to disconnect the capacitors 29—32 from the tested capacitors 50—53. The actuation of the contactor 102 applies power to a timer 106, which then closes a switch 105 to apply power to a relay 109 which closes contactors 112, 113, 114 and 115.

The output voltage of the rectifier tubes V2 and V3 is measured by a voltmeter 133 connected in series with voltage multiplier resistances 134 and 135. When an adjusting member 140 of the voltage controller 17 is set to supply a low voltage to the transformer 25, a contactor 170 engages a contact 171 and a normally closed contactor 175 short circuits the resistance 134. A lamp 176 is lighted to indicate to an operator that the voltage output of the rectifier tubes V2 and V3 should be read on a low scale (not shown) of the voltmeter 133. As the adjusting member 140 is moved to raise the voltage applied to the transformer 25 (and consequently the output voltage of the tubes V2 and V3) a cam (not shown) is actuated by the adjusting member 140 to move the contactor 170 into engagement with a contact 172, whereupon a relay 180 is energized to open the contactor 175 to remove the short circuit from the voltage multiplier resistance 134. The lamp 176 is extinguished and a lamp 182 is lighted to indicate to an operator that a high scale (not shown) of the voltmeter 133 should now be used to read the voltage output of the tubes V2 and V3. The movement of the contactor 170 also energizes a relay 184 which opens the normally closed contactors 123—126 and closes contactors 185, 186, 187 and 188. The output of the rectifier tubes V2 and V3 is passed, upon the closing of contactors 112—115, through a filter network 120, contactors 112—115, resistances 190, 191, 192 and 193, resistances 196, 197, 198 and 199, closed contactors 185—188, and closed contactors 68—71 to the capacitors 50—53. The filter network 120 is provided for smoothing the output voltage of the tubes V2 and V3. If at this time no shorts are present in the capacitors 50—53, the voltage across each will equal the output voltage of the rectifier tubes V2 and V3 and pilot lamps 130, 131, 132 and 133 will be lighted to indicate that no shorts are present in the capacitors 50—53. If, however, any one of the capacitors 50—53 has an internal short or shorts, the voltage across that capacitor will be practically zero and the pilot light 130—133 associated therewith will be extinguished. Thus, an extinguished pilot light indicates that the capacitor associated therewith has an internal short which was not removed when the bank of capacitors 29—32 were discharged.

At the end of a predetermined time interval, the timer 106 opens the switch 105 to deenergize the relay 109 and open contactors 112—115 whereby the output voltage of the rectifier tubes V2 and V3 is disconnected from the capacitors 50—53 and the test is ended.

As the capacitors 50—53 are being tested a plurality of metallized electrode capacitors 142, 143, 144 and 145 are manually connected as illustrated in the drawings. Upon completion of the testing of capacitors 50—53, the hood 55 is removed therefrom and is positioned to cover the capacitors 142—145. The movement of the hood 55 opens switches 56 and 80 and closes switches 150 and 151. These switches are shown in Fig. 1 but the physical connection between them and the hood 55 is not shown. The opening of switch 56 deenergizes the relays 60—63 to open contactors 68—71 and close contactors 75—78. This connects the capacitors 50—53 to ground 200 (Fig. 2) through resistances 202, 203, 204 and 205 to insure that there is no charge on the capacitors 50—53. The opening of the switch 56 also deenergizes the relay 57 to close contactors 58, 59, 64 and 65 to connect the capacitors 50—53 to ground 200 through resistances 206, 207, 208 and 209, thereby providing a second assurance that the capacitors 50—53 are completely free of any charge.

The closing of switch 150 applies power to relays 154, 155, 156 and 157 to close contactors 160, 161, 162 and 163 and open contactors 166, 167, 168 and 169, respectively. This also energizes a relay 212 to open normally closed contactors 220, 221, 222 and 223. The closing of switch 151 applies power to the time delay relay 82 which closes contactor 83 after a time delay of approximately one second whereby the relays 90—93 are energized. Relays 90—93 close contactors 96—99 and the capacitors 29—32 are discharged through closed contactors 160—163 and the metallized electrode capacitors 142—145, respectively. After approximately one second the time delay relay 101 is energized to move the contactor 102 to engage the contact 104 to actuate the timer 106. The timer 106 closes the switch 105 to energize the relay 109 which closes contactors 112—115 whereby the voltage output of the rectifier tubes V2 and V3 is applied to the capacitors 142—145. If any of the capacitors 142, 143, 144 and 145 has an internal short, a pilot light 228, 229, 230, or 231 connected across the capacitors 142—145, respectively, will be extinguished as above-described.

At the end of a predetermined time interval, the timer 106 opens the switch 105 to deenergize the relay 109 and open the contactors 112—115 whereby the output voltage of the rectifier tubes V2 and V3 is disconnected from the capacitors 142—145 and the test is ended.

The hood 55 is then moved to cover four additional capacitors connected in the positions previously occupied by the capacitors 50—53, and these additional capacitors are tested as above-described.

The movement of the hood 55 opens switches 150 and 151 (Fig. 1) to deenergize the relays 154—157 and the relay 212. When relays 154—157 are deenergized, the capacitors 142—145 are connected to ground 200 through resistances 214, 215, 216 and 217, respectively, to insure that the capacitors 142—145 are not charged. When the relay 212 is deenergized, the contactors 220, 221, 222 and 223 are closed to connect the capacitors 142—145 to ground 200 through resistances 224, 225, 226 and 227, respectively. The capacitors 142—145 can now be manually removed and replaced by other capacitors to be tested.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. A circuit for testing electrical components, comprising a power supply, a bank of capacitors connected to the power supply, switching means for connecting the electrical components to the capacitors whereby they are discharged through said electrical components, a timer, said switching means disconnecting the electrical components from the capacitors after a predetermined time interval and connecting said timer to the power supply, said timer connecting the components to the power supply for a predetermined time interval, means connected to the electrical components for indicating failures therein, a plurality of shorting circuits connected across the electrical components, and means for holding said shorting circuits open during the testing of said components and for closing said shorting circuits after said testing is completed.

2. A circuit for testing electrical capacitors having metallized electrodes, comprising a power supply, a bank of capacitors connected to the power supply, timing means for connecting the metallized electrode capacitors to the power supply for a predetermined time interval, switching means for connecting the metallized electrode capacitors to the bank of capacitors whereby they are discharged through said metallized electrode capacitors to vaporize portions of the metallized electrodes at points where electrical shorts are present between the metallized electrodes, said switching means also disconnecting the metallized electrode capacitors from the bank of capacitors after they are discharged and connecting the timing means to the power supply whereby said timing means connects the metallized electrode capacitors to the power supply for said predetermined time interval, a plurality of shorting circuits connected across the metallized electrode capacitors, and switch means for closing said shorting circuits after the power supply is disconnected from the metallized electrode capacitors by the timer.

3. A circuit for testing electrical capacitors, comprising a power supply, a bank of capacitors connected to the power supply, switching means for connecting the bank of capacitors to a plurality of capacitors to be tested wherby the bank of capacitors is discharged through the capacitors to be tested, a timing relay connected to the power supply for operating the switching means, said capacitors to be tested having metallized electrodes which are vaporized at points where electrical shorts are present to thus remove said shorts when the bank of capacitors is discharged, a timer, said timing relay sequentially disconnecting the switching means from the power supply and connecting the power supply to the timer after a predetermined time interval, means connected to the capacitors to be tested for indicating whether said capacitors are faulty, said timer disconnecting the power supply from the capacitors to be tested after a predetermined interval of time, a plurality of shorting circuits connected across the metallized electrode capacitors, and switch means for closing the shorting circuits.

4. A circuit for removing internal shorts from and testing electrical capacitors having metallized electrodes, comprising a power supply, a bank of capacitors connected to the power supply, a network of switches and relays for connecting the banks of capacitors to a plurality of metallized electrode capacitors whereby said bank of capacitors is discharged through the metallized electrode capacitors to remove shorts therein by vaporizing areas of the metallized electrodes adjacent to said shorts, a timer for connecting the metallized electrode capacitors to the power supply, said network disconnecting the bank of capacitors from said metallized electrode capacitors and actuating the timer after an interval of time whereby said timer connects the power supply to said metallized electrode capacitors, means connected to said metallized electrode capacitors for indicating whether there are any shorts remaining in said capacitors, a plurality of shorting circuits connected across the metallized electrode capacitors, and switch means for opening and closing the shorting circuits.

5. A circuit for removing detecting internal shorts in metallized electrode capacitors, comprising a power supply, a bank of capacitors connected to the power supply, circuit means for connecting the bank of capacitors to a plurality of metallized electrode capacitors whereby said bank of capacitors is discharged through the metallized electrode capacitors to remove shorts therein by vaporizing areas of the metallized electrodes adjacent to said shorts, a timer for connecting the power supply to the metallized electrode capacitors, a first delay relay having a contact movable between a position to energize the circuit means and a position to energize the timer, a second delay relay having contacts to energize the first delay relay after a predetermined time interval whereby said first delay relay maintains said circuit means energized for a second predetermined time and then energizes the timer, said timer then connecting the power supply to the metallized electrode capacitors and maintaining the connection for a third predetermined time interval, means energized by the power supply for indicating whether the capacitors are shorted, a plurality of shorting circuits connected across the metallized electrode capacitors, and means for opening and closing the shorting circuits.

6. A circuit for testing a capacitor which comprises a first capacitor, means for charging said first capacitor, a lamp operable upon application of a predetermined voltage connected across a capacitor under test, a switching relay circuit for connecting the first capacitor to charge the capacitor under test, a timer, a first time delay relay having a contact movable between a position to energize the switching relay circuit and a position to energize the timer, a second time delay relay having contacts connected to energize the first time delay relay after a predetermined period of time whereby said first time delay relay maintains the switching relay circuit energized for a second predetermined period of time and then energizes the timer, and means operated by the timer for a preconcerted period of time for applying said predetermined voltage across the capacitor under test to light the lamp.

References Cited in the file of this patent

UNITED STATES PATENTS

| | | |
|---|---|---|
| 965,992 | Dean | Aug. 2, 1910 |
| 2,070,435 | Katzman | Feb. 9, 1937 |
| 2,108,637 | Bartgis | Feb. 15, 1938 |
| 2,593,131 | Foust et al. | Apr. 15, 1952 |